United States Patent [19]
Lockhart, Jr. et al.

[11] Patent Number: 5,283,832
[45] Date of Patent: Feb. 1, 1994

[54] PAGING MESSAGE ENCRYPTION

[75] Inventors: Robert K. Lockhart, Jr., Boynton Beach; William J. Kuznicki, Coral Springs, both of Fla.

[73] Assignee: Motorola, Inc., Schaumburg, Ill.

[21] Appl. No.: 781,546

[22] Filed: Oct. 22, 1991

[51] Int. Cl.$^5$ ............................................. H04L 9/00
[52] U.S. Cl. ........................................... 380/49; 380/9
[58] Field of Search ............... 380/9, 49; 340/825.44; 455/56.1

[56] References Cited

U.S. PATENT DOCUMENTS

| | | | |
|---|---|---|---|
| 4,278,837 | 7/1981 | Best | 380/49 |
| 4,613,901 | 9/1986 | Gilhousen et al. | 380/49 |
| 4,627,074 | 12/1986 | Markwitz et al. | 380/9 |
| 4,677,434 | 6/1987 | Fascenda | 380/23 |
| 4,876,718 | 10/1989 | Citta et al. | 380/49 |
| 4,910,510 | 3/1990 | Davis | 340/825.44 |
| 4,965,827 | 10/1990 | McDonald | 380/25 |
| 5,016,275 | 5/1991 | Smith | 380/9 |
| 5,073,767 | 12/1991 | Holmes et al. | 340/825.44 |
| 5,091,941 | 2/1992 | Needle et al. | 380/49 |
| 5,119,502 | 6/1992 | Kallin et al. | 455/56.1 |

OTHER PUBLICATIONS

Motorola PMR 2000 Series POCSAG Alphanumeric Display Personal Message Receiver Instruction Manual (68P81048C80-A), pp. 2-4, 1987.

Primary Examiner—Salvatore Cangialosi
Attorney, Agent, or Firm—Gregg Rasor; William E. Koch; Thomas G. Berry

[57] ABSTRACT

A paging receiver (15) for receiving secure radio frequency (RF) communications comprises a receiver circuit (102) for receiving and demodulating a signal to obtain information. A memory device (108) is coupled to the receiver circuit (102) for storing the information. A de-encrypter (110) is coupled to the memory device (108) for de-encrypting the information and a decoder (112) is coupled to the de-encrypter (110) for decoding the de-encrypted information to derive a message. User input controls (120) selectably generate a user input signal. A controller (114) is coupled to the memory device (108) and the user input controls (120) for causing the memory device (108) to provide the information stored therein to the de-encrypter (110) in response to the user input signal being equivalent to a predetermined de-encryption signal.

Claims, 9 Drawing Sheets

PAGING MESSAGE ENCRYPTION

FIELD OF THE INVENTION

This invention relates in general to selective call systems, and in particular to a method and apparatus for secure selective call message transmission and reception.

BACKGROUND OF THE INVENTION

With the increase in the use of selective call systems, such as paging systems, for transferring information, the need for maintaining security while transferring information has developed. If a competitor were to find out the address of a selective call receiver, the communications could be received by the competitor at another selective call receiver. The increase in group calling whereby a message for all of the salesmen of a company comprising confidential information could be sent to a single address which multiple selective call receivers contain accentuates the need for secure communications. The message could be intercepted by a competitor utilizing the group address.

The military and some governmental authorities use encryption techniques for scrambling communications, but these techniques are typically costly and require additional components. The decrease in the size of selective call receivers and the decrease in the cost thereof has opened new markets for selective call communications, many of which are unwilling to carry bulky receivers or pay high costs but nevertheless would prefer the security of encrypted communications.

Thus, what is needed is a method and apparatus for encrypting and de-encrypting a selective call signal to prevent unauthorized perusal of the information encoded thereon.

DETAILED DESCRIPTION OF THE INVENTION

Figure 1:
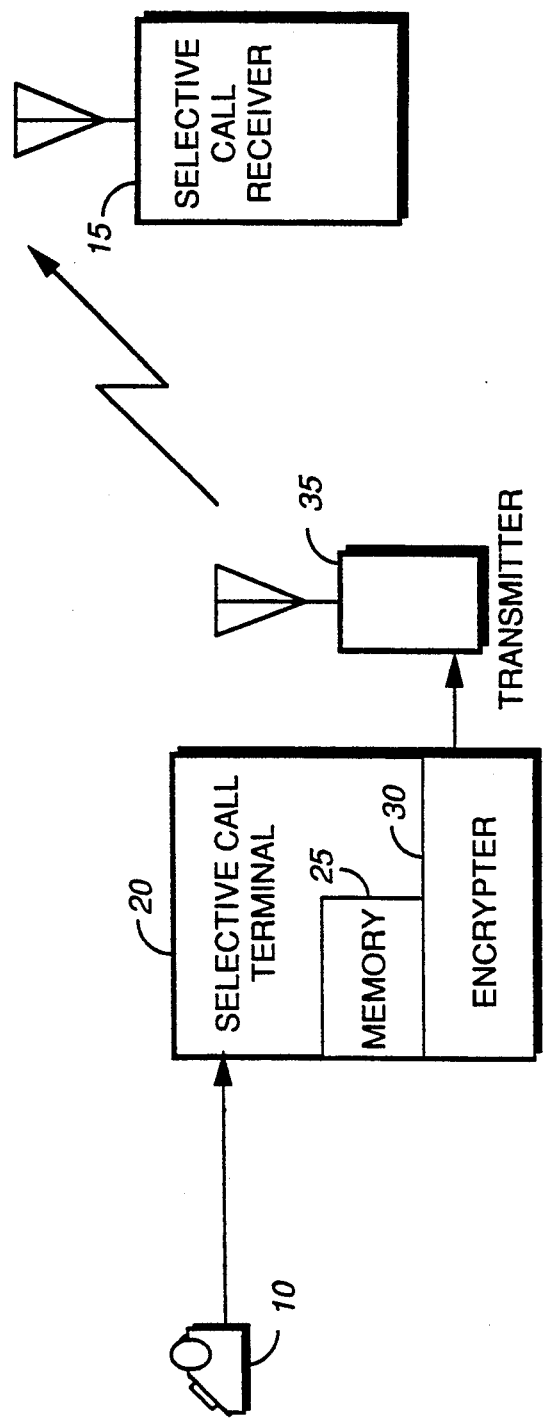
FIG. 1 is a block diagram of a selective call system in accordance with the present invention.

Referring to FIG. 1, a radio frequency (RF) communications system, such as a selective call system, receives calls from input devices such as telephone 10 comprising message information intended for reception by a selective call receiver 15. The message information is received by a selective call terminal 20 and encoded in a manner well known to those skilled in the art. The message information may be received via the public switched telephone network or any conventional radio or hardwire link.

The selective call terminal 20, in accordance with the present invention, comprises a memory 25 and an encrypter 30, which operate to encrypt the encoded message information. The present invention, therefore, comprises the memory 25 and the encrypter 30 and would be coupled between the selective call terminal 20 and a transmitter 35. According to the present invention, the memory 25 is a memory wherein selective call addresses of the selective call receiver 15 are stored along with a code corresponding to each selective call address to be used for encryption. The memory 25 could be a portion of the selective call terminal memory wherein selective call addresses are stored and which is conventionally used for encoding message information and deriving address information corresponding to the selective call receiver 15 intended to receive the message. The encrypter 30 could be constructed in software within the selective call terminal so that it would be unnecessary for the selective call system service provider to add additional hardware.

The selective call message which is encoded by the selective call terminal 20 is then encrypted by the encrypter 30 using the memory 25 and then provided to the transmitter 35 for transmission therefrom as a selective call signal. The signal is received by the selective call receiver 15.

Figure 2:
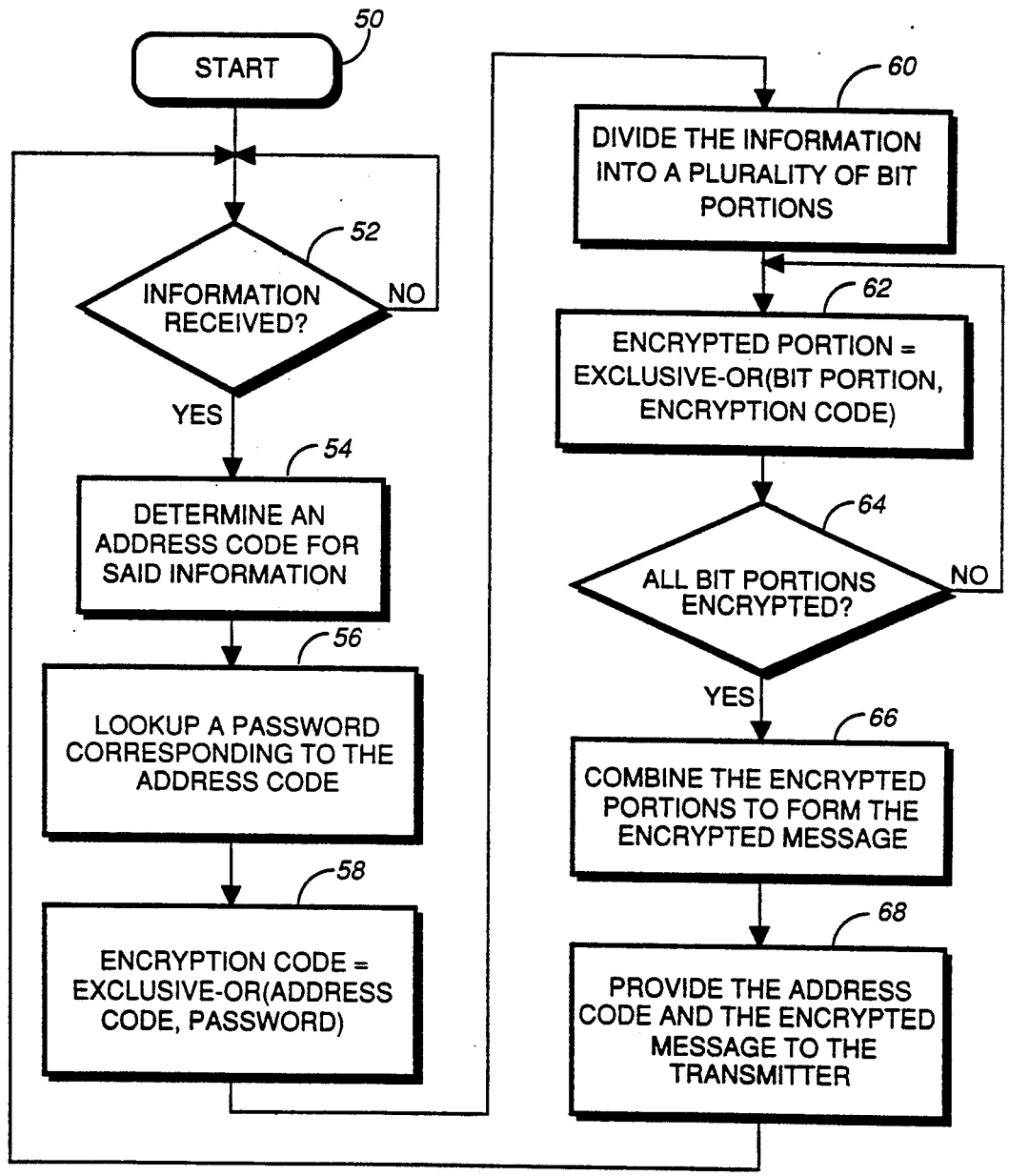
FIG. 2 is a flow diagram of the operation of the encrypter of FIG. 1, in accordance with a preferred embodiment of the present invention.

Referring next to FIG. 2, a flow diagram of the operation of the encrypter in accordance with the preferred embodiment of the present invention starts 50 upon power up. Until information is received by the encrypter 52 (i.e., encoded message information is received from the selective call terminal 20 (FIG. 1)), processing by the encrypter remains in an idle loop.

When information to be encrypted is received 52, the address code corresponding to the message is determined from the message information 54. Then, the memory 25 (FIG. 1) is accessed and processing looks up the password corresponding to the address code 56. A password is assigned to each selective call receiver 15 (FIG. 1). The user can change the password for the selective call receiver 15 as long as the password is also changed in the memory 25. This can be done using conventional over-the-air programming techniques, such as that disclosed in U.S. Pat. No. 4,910,510 assigned to the assignee of the present invention and the teachings of which are incorporated herein. The selective call terminal 20 could be accessed to over-the-air reprogram the selective call receiver 15 and concurrently reprogram the memory 25.

After the password is looked up 56, an encryption code is calculated using the selective call address and the password 58. According to the preferred embodiment of the present invention, an exclusive-OR function is performed on the bits of the address code and the password. It is understood, though, that any function which would produce a unique result utilizing the address code and the password would be sufficient for the purposes of this invention. Next, the information to be encrypted is divided into a plurality of bit portions 60. The size of the bit portions corresponds to the bits in the encryption code. An encrypted portion of the information is calculated 62 as a function of the encryption code and a portion of the information. Until all portions of the information have been encrypted 64, each portion is encrypted 62 by exclusive-OR the portion and the encryption code. When the all the portions of the information are encrypted 64, the portions are combined to form the encrypted message 66 and the address code and the encrypted message are provided 68 to the transmitter 35 (FIG. 1). Processing returns to await the next information received from the selective call terminal 20 (FIG. 1).

Figure 3:
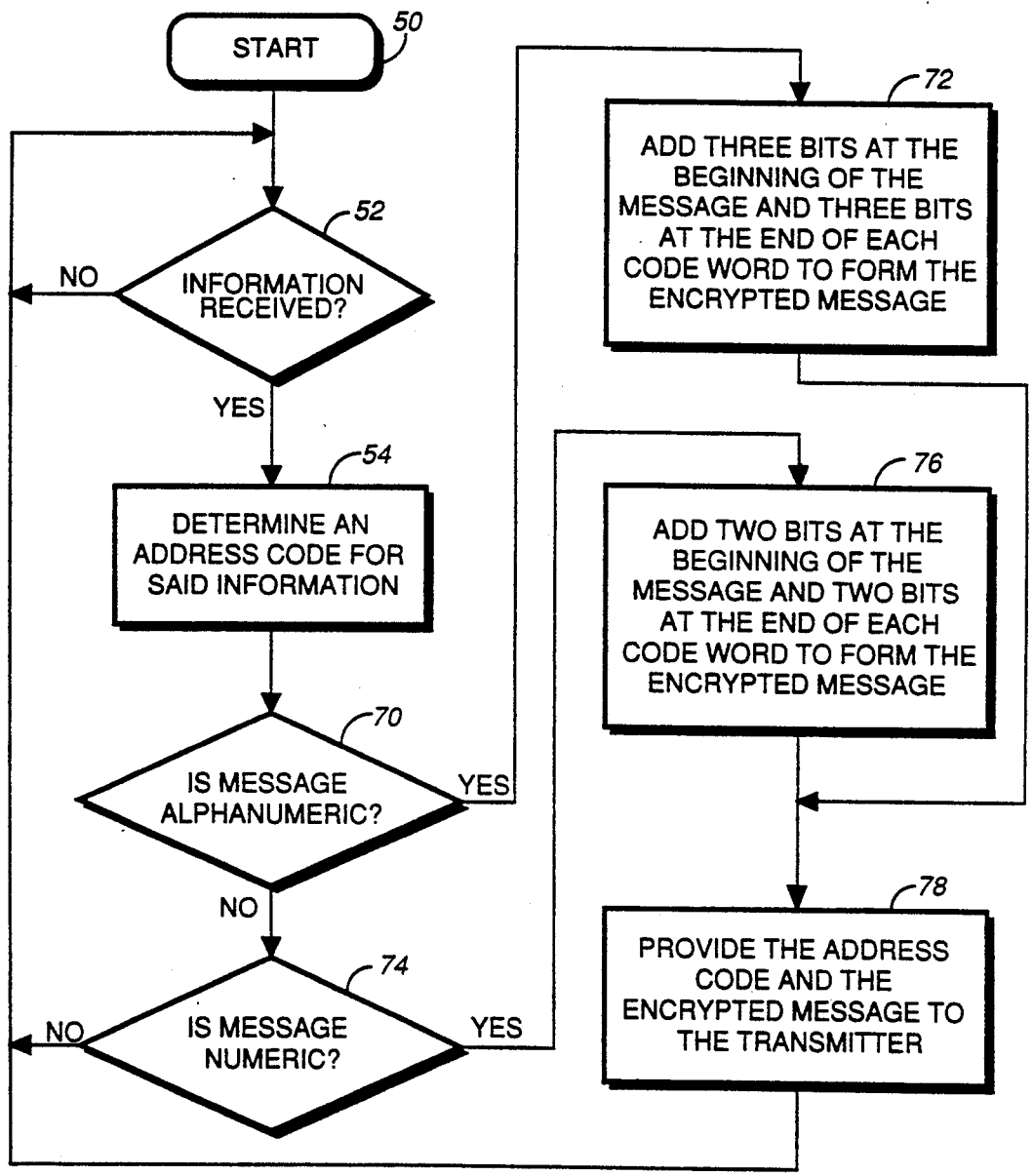
FIG. 3 is a flow diagram of the operation of the encrypter of FIG. 1, in accordance with an alternate embodiment of the present invention.

Referring next to FIG. 3, operation of an alternate embodiment of the present invention also starts 50 upon power up and remains in an idle loop until information is received 52 from the selective call terminal 20 (FIG. 1). When information is received 52, the address code corresponding to the information is determined 54 and the information is examined to determine if the message comprises alphanumeric information 70.

This alternate embodiment is particularly suited for use with POCSAG encoded selective call messages. POCSAG is a paging protocol developed by the Post Office Code Standardization Advisory Group which formats signals comprising four-bit numeric words or seven-bit alphanumeric words. Each POCSAG code word is a 32,21 BCH word. Twenty-one bits are information bits and eleven bits are parity bits. One of the twenty-one bits is a start bit, leaving twenty bits of information. For alphanumeric information, two alphanumeric words plus six bits of another word form a code word. For numeric information, five four-bit words form a code word.

The present invention would limit the alphanumeric information to two words per code word and the numeric information to four words per code word. If the message is alphanumeric 70, three predetermined bits are added at the beginning of each code word and three predetermined bits are added at the end of each code word to form the encrypted message 72. If the message is not alphanumeric 70 but instead is numeric 74, two predetermined bits are added at the beginning of each code word and two predetermined bits are added at the end of each code word to form the encrypted message 76. If the message is neither alphanumeric 70 or numeric 74, processing returns to await the next information received 52 because the nature of the encryption is particularly suited to POCSAG alphanumeric and numeric.

The encryption bits to be added to the front and back of each code word are predetermined, but need not be the same. Since POCSAG is a binary code, the number of possible bit encryption patterns for numeric information would be sixteen and for alphanumeric information would be sixty-four. The bit patterns could be standard for all selective call receivers or vary in a predetermined manner over a period of time. Alternatively, memory 25 (FIG. 1) could be used to assign a particular bit pattern to a selective call address. If so, step 56 of FIG. 2 involving looking up the password could be utilized between steps 54 and 70 to allow for looking up the particular bit pattern associated with the address code.

Once the encrypted message is formed 72,76, the address code and the encrypted message are provided 78 to the transmitter 35 (FIG. 1) for transmission therefrom and processing returns to await the next information received 52.

Figure 4A:
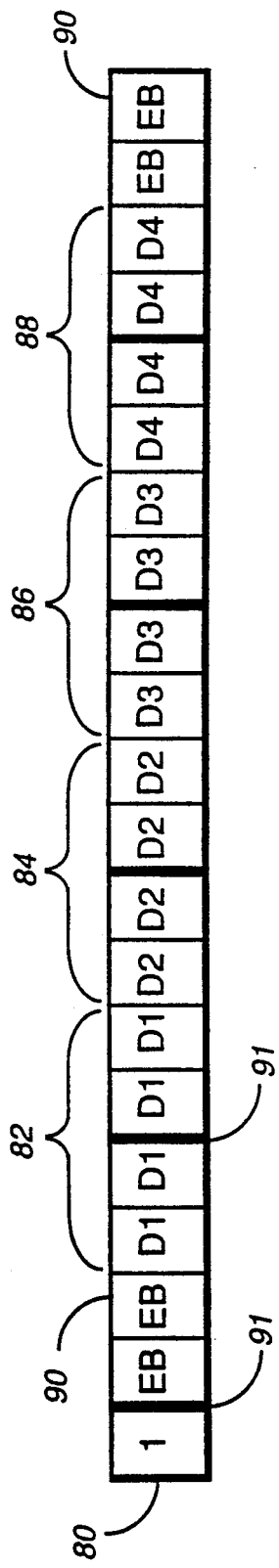
FIGS. 4A and 4B are diagrams of encrypted code words in accordance with an alternate embodiment of the present invention.
Figure 4B:
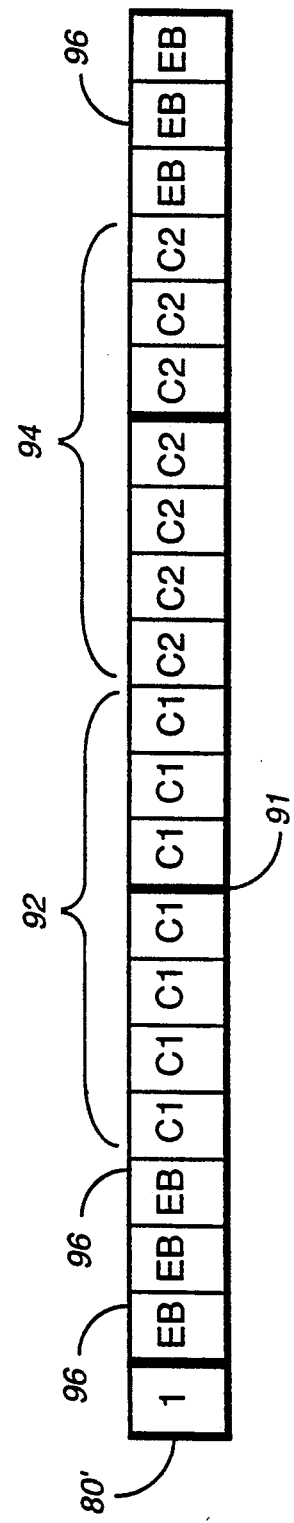

Referring to FIGS. 4A and 4B, diagrams of code words 80 encrypted according to the process diagrammed in FIG. 3 are shown. Code word 80 in FIG. 4A is a numeric code word comprising four digits: D1 82, D2 84, D3 86, and D4 88. The encryption bits (EB) 90 are shown with two bits 90 before the four digits and two bits 90 after the four digits. By the displacement of the bits of the digits, four-bit decoding would result in scrambled and nonsensical information because a receiver 15 (FIG. 1) receiving the signal would read a four-bit digit between each barrier 91. Likewise, the two seven-bit characters 92,94 of the alphanumeric code word 80' of FIG. 4B have three encryption bits 96 placed at the beginning of the code word and three encryption bits 96 at the end of the code word. By shifting the code words 92,94, decoding will result in nonsensical information because of the added encryption bits 96.

Figure 5:
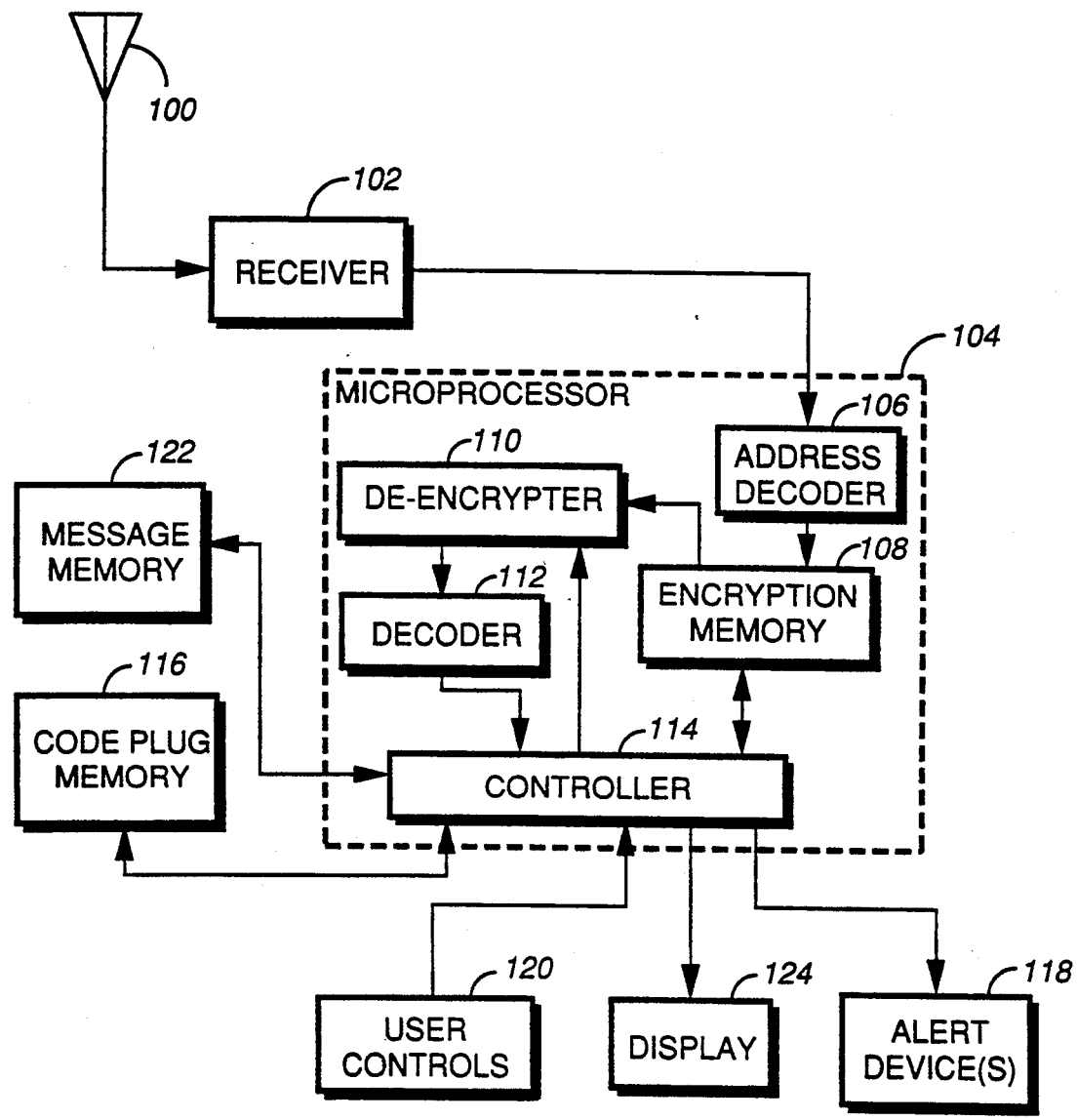
FIG. 5 is a block diagram of the selective call receiver of FIG. 1, in accordance with the present invention.

Referring to FIG. 5, an embodiment of the selective call receiver 15 of FIG. 1 is depicted in block diagram format. An RF signal is received by an antenna 100 and provided to a receiver circuit 102 The receiver circuit 102 demodulates the signal to recover information and provides the information to the microprocessor 104. The microprocessor 104, in accordance with the present invention, comprises an address decoder 106, an encryption memory 108, a de-encrypter 110, a decoder, 112, and a controller 114. Other conventional f  res of the selective call receiver 15 could also be handled by the microprocessor 104.

The address decoder 106, operating in response to signals from the controller 114, examines the information received from the receiver 102 to determine if the address of the selective call receiver 15 is present in the information. The controller 114 retrieves the address of the selective call receiver from a nonvolatile code plug memory 116 and provides the address to the address decoder for correlation with the information received. If the address of the receiver 15 is not present then the message is not intended for the receiver 15 and the information is ignored.

When the address is recognized by the address decoder 106, a signal is sent to the controller 114 that the address is detected and the information following is provided to the encryption memory 108 for storage therein. The controller 114, in response to the signal from the address decoder 106, activates an alert device 118 to inform the user that a message has been received. The alert device 118 could be an audible, visual or tactile alerting device or any combination thereof.

The user can then input a code via the user controls 120 to the controller 114. Upon reception of the code, the controller 114 signals the encryption memory 108 to provide the stored information to the de-encrypter 110 for de-encryption. Once de-encrypted, the information is decoded by the decoder 112 to derive the selective call message and provided to the controller 114 for storage in a message memory 122 and/or output to a display 124.

By utilizing the internal microprocessor 104 memory for the encryption memory 108 and devising the de-encrypter 110 as software within the microprocessor 104, no additional parts are required for the selective call receiver 15. In addition, the cost of manufacture is approximately the same for a selective call receiver 15 embodying the present invention.

Figure 6:
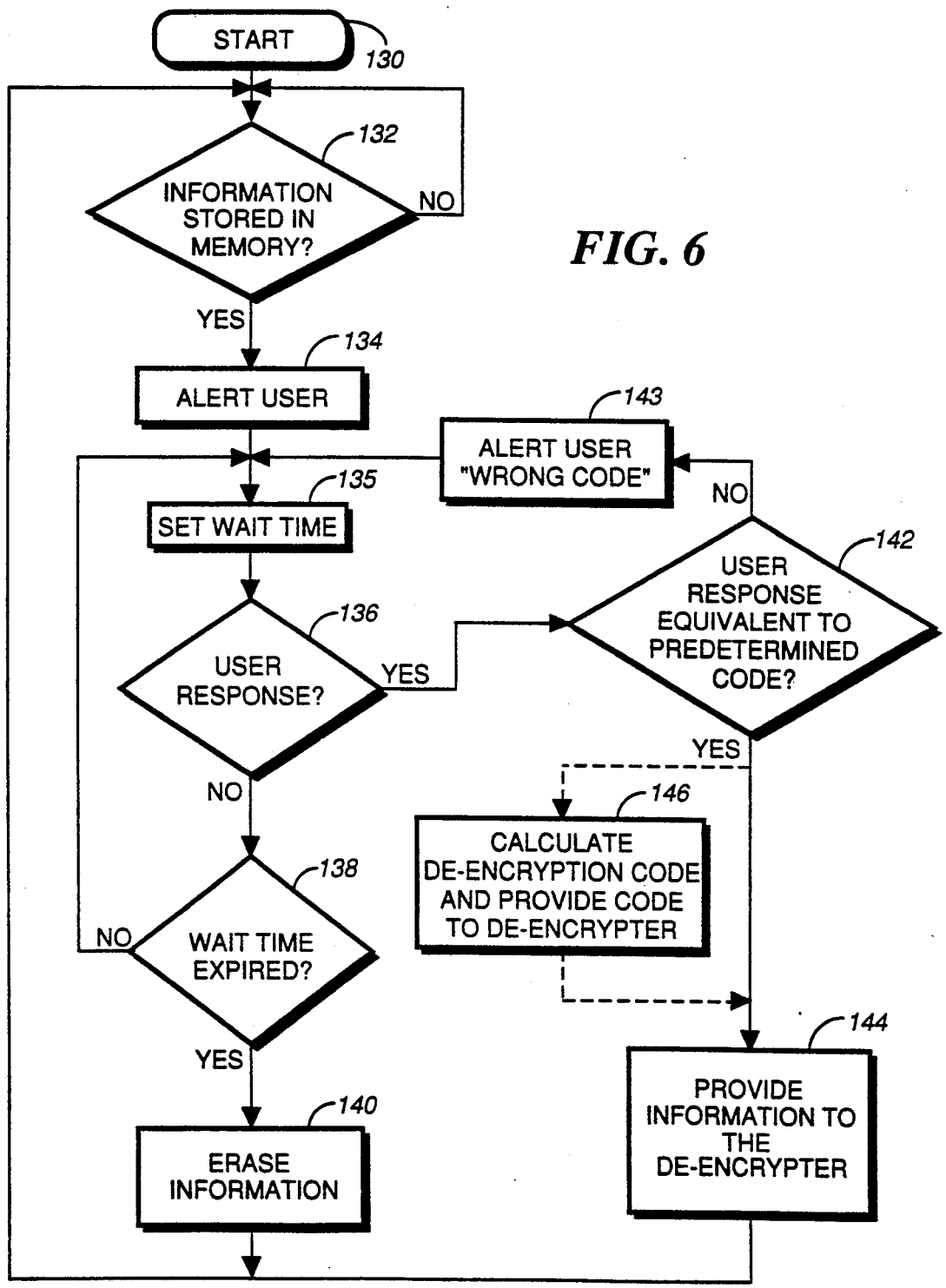
FIG. 6 is a flow diagram of the operation of the controller of the selective call receiver of FIG. 5, in accordance with the present invention.

Referring to FIG. 6, operation of the controller 114 (FIG. 5) in accordance with the present invention starts 130 when the microprocessor 104 is energized, after which time the controller 114 examines the encryption memory 108 (FIG. 5) to determine if information is stored 132 in the memory 108. If no information is stored 132 in the memory 108, processing remains in an idle loop until information is detected 132 in the memory 108.

When information is stored 132 in the memory 108, the user is alerted of this fact 134 by the controller 114 activating one of the alert devices 118 and displaying a message on the display 124 (FIG. 5) instructing the user to enter the de-encryption code. The controller 114 then sets a timer WAIT TIME 135 and awaits an input signal from the user 136 via activation of the user controls 120 (FIG. 5). The controller 114 continues to await a user response 136 as long as the timer WAIT TIME has not expired 138. When the timer WAIT TIME expires 138 without a timely response from the user 136, the information stored in the memory 108 is erased 140 by an appropriate signal from the controller 114. Optionally, the erasure can be avoided by user input of a disable command via the user controls 120 to avoid unintentional erasure when, for example, the user is away from the receiver for a period of time greater than the WAIT TIME.

When a user input is received 136 via the user controls 120 (FIG. 5) the signal is compared to a predetermined encryption code or password retrieved by the controller 114 from the code plug memory 116 (FIG. 5) to determine equivalency 142. If the user input signal is not equivalent to the password 142, the user is alerted and the message "WRONG CODE" is displayed 143. Processing then resets the timer WAIT TIME 135 and awaits a next user response 136.

If the user input signal is determined to be equivalent to the password 142, the controller 114 signals the memory 108 to provide the information to the de-encrypter 110 (FIG. 5) for de-encryption and the controller 114 awaits the next detection 132 of information stored in the memory 108. An alternative step in processing would allow for the de-encryption code to be calculated 146 from the password or predetermined code and the selective call address for provision to the de-encrypter 110 (FIG. 5) during each reception of information. Depending on the de-encryption method used and the frequency at which the predetermined code is altered, the calculation step 146 may or may not be necessary. Both the selective call address and the password are stored in the code plug memory 116 and are retrieved therefrom by the controller 114 (FIG. 5) as needed.

Figure 7A:
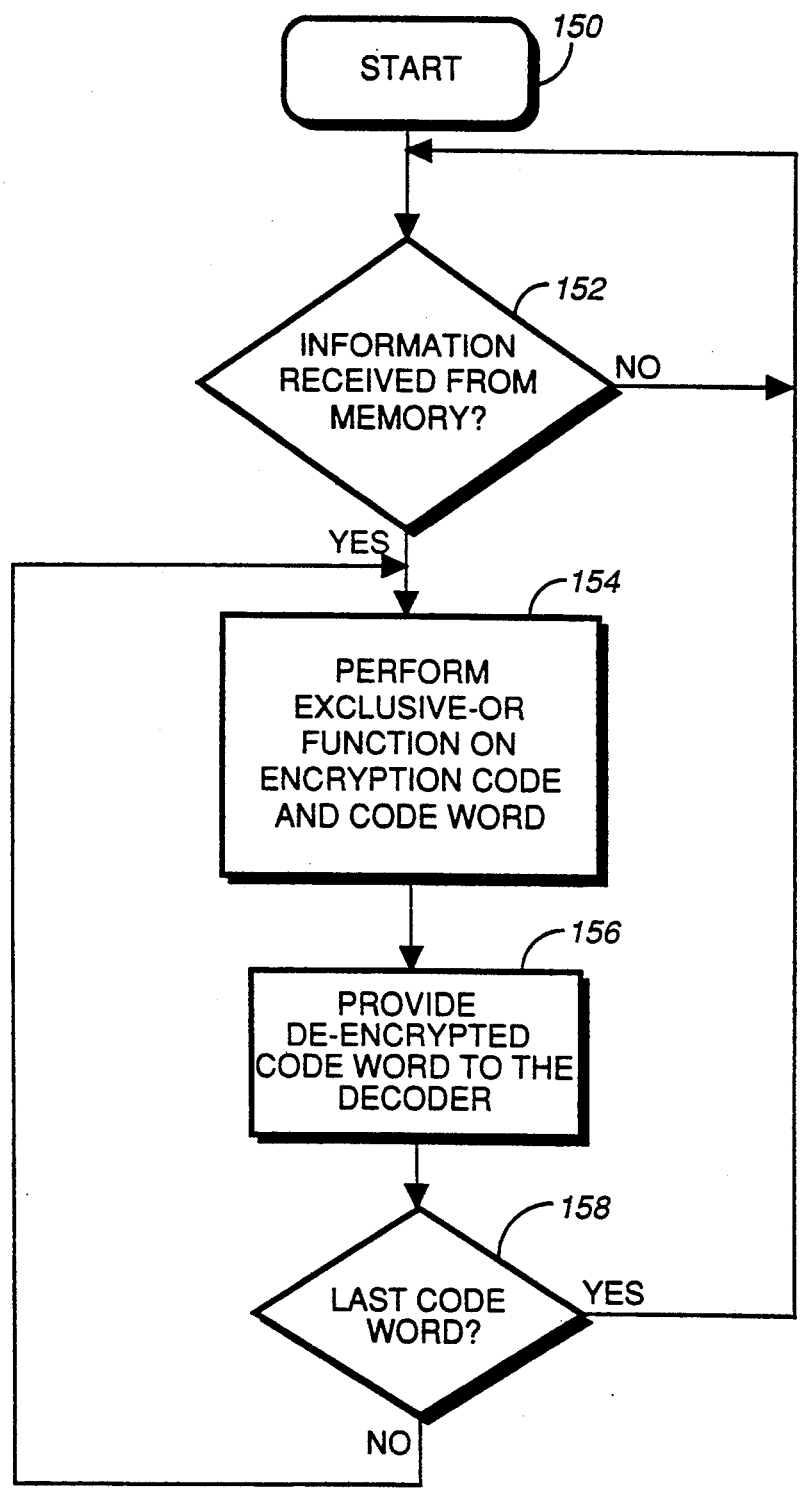
FIGS. 7A and 7B are flow diagrams of the operation of the de-encrypter of the selective call receiver of FIG. 5, in accordance with a preferred embodiment and an alternate embodiment of the present invention, respectively.
Figure 7B:
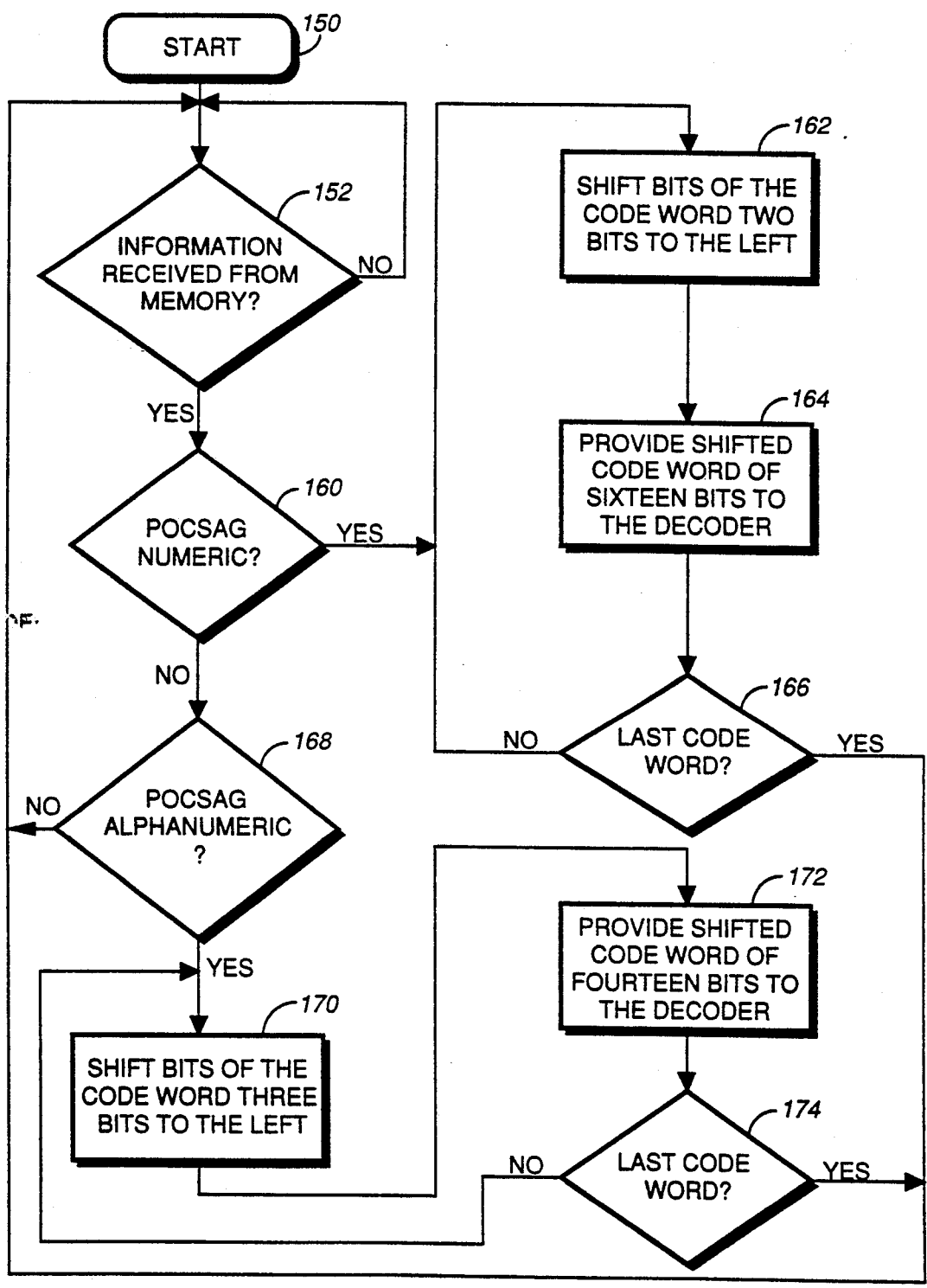

Referring to FIGS. 7A and 7B, the operation of the de-encrypter starts 150 upon energization of the microprocessor 104 (FIG. 5) and initially determines whether information is received 152 from the memory 108 (FIG. 5). Until information is received 152 from the memory 108, processing remains in an idle loop until information is received 152.

FIG. 7A depicts the operation of the preferred embodiment of the present invention. When information is received 152 by the de-encrypter 110 from the memory 108 (FIG. 5), the de-encrypter 110 de-encrypts each code word by performing the exclusive-OR function on the encryption code previously calculated and the code word 154 and providing the de-encrypted code word 156 to the decoder 112 (FIG. 5). The encryption code can be calculated by the controller 114 and provided to the de-encrypter 110 (FIG. 5) as described above, or previously calculated and stored in the de-encrypter 110.

As stated above, the function performed may be any function as long as a unique result is derived from performing the function and as long as the de-encrypter 110 of the selective call receiver 15 and the encrypter 30 of the selective call terminal 20 (FIG. 1) perform complementary functions. As is well known to those skilled in the art, the exclusive-OR function is its own complement (i.e., A X'OR B=C and C X'OR A=B) when performed on binary information, and therefore the encryption function of preferred embodiment of the present invention.

After the de-encrypted code word is provided to the decoder 156, processing determines whether the last code word has been de-encrypted 158. If the last code word has not been de-encrypted 158, processing returns to step 154 to perform the exclusive-OR function on the next code word and the encryption code 154. If the last code word has been de-encrypted 158, processing returns to the idle loop to await the next reception of information 152 from the encryption memory 108.

Referring to FIG. 7B, processing according to an alternate embodiment of the present invention, after receiving 152 information from the memory 108 (FIG. 5), determines whether the information is in POCSAG numeric format 160 or POCSAG alphanumeric format 168. If the information is POCSAG numeric formatted information 160, the de-encrypter 110 (FIG. 5) shifts the bits of the code word two bits to the left 162 and provides the sixteen-bit code word 164 to the decoder 112 (FIG. 5). If the code word is not the last code word of the information received 166, processing returns to shift the bits of the next code word 162 and provide the de-encrypted sixteen bits 164 to the decoder 112. If the code word is the last code word of the information received 166, processing returns to the idle loop to await the next reception of information 152 from the encryption memory 108.

If the information is POCSAG alphanumeric formatted information 168, the de-encrypter 110 (FIG. 5) shifts the bits of the code word three bits to the left 170 and provides the fourteen-bit code word 172 to the decoder 112 (FIG. 5). If the code word is not the last code word of the information received 174, processing returns to shift the bits of the next code word 170 and provide the de-encrypted fourteen bits 172 to the decoder 112. If the code word is the last code word of the information received 174, processing returns to the idle loop to await the next reception of information 152 from the encryption memory 108.

If the code word is neither numeric formatted POCSAG 160 nor alphanumeric formatted POCSAG 168, processing of the de-encryption routine according to the alternate embodiment of the present invention returns to the idle loop to await the next reception of information 152 from the encryption memory 108.

Figure 8:
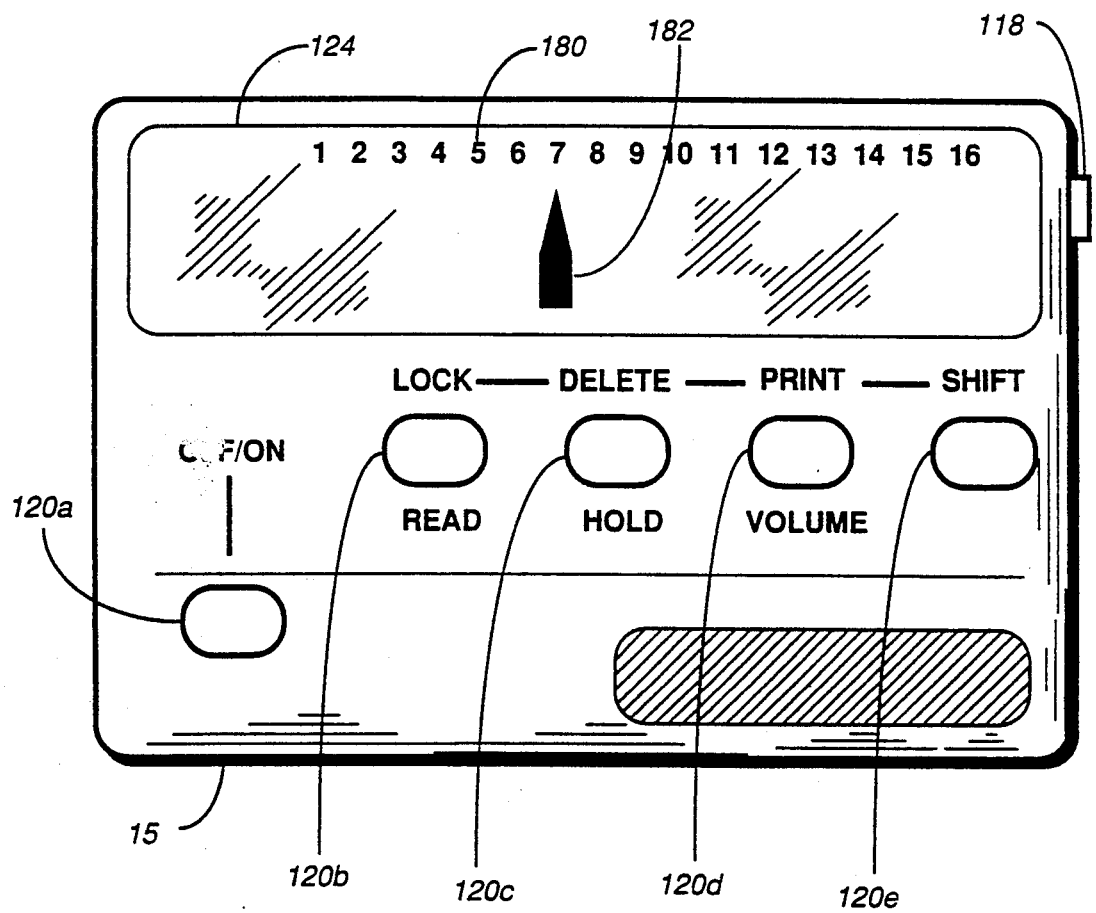
FIG. 8 is a depiction of an embodiment of the selective call receiver of FIG. 5, in accordance with the present invention.

Referring to FIG. 8, a depiction of the selective call receiver 15 of FIG. 1 shows the display 124, a visual alerting device 118 and five user controls 120a-e. The selective call receiver 15 is similar to the PMR 2000 series Alphanumeric Display Personal Message Receiver manufactured by Motorola, Inc. of Schaumburg, Illinois. Selective call receivers, because of the need for small size and portability, typically do not have a keyboard for inputting a numerical code. Successive activation of user controls are substituted for a numeric keyboard. User control 120a is a power ON/OFF control.

The selective call receiver 15 has sixteen message slots in the message memory 122 (FIG. 5) identified by the permanently displayed numerals 180. A pointer 182 is displayed on the display 124 to indicate a selected message slot. User controls 120b, 120c, and 120d are two-function controls toggled between the functions by activation of user control 120e. Control buttons 120b and 120c select and display the messages stored in the message slots. In accordance with the present invention, while the controller 114 is awaiting a user response 136 (FIG. 6), the user's activation of control 120e to enter an indicator movable mode, followed by activation of controls 120b, 120c and 120d, to select message slots one to ten, is interpreted by the controller 114 to be numeric digits entered, the numeric digits corresponding to the selected message slot indicated by pointer 182. In this manner, the user can enter the password to allow de-encryption.

By now it should be appreciated that there has been provided a method and apparatus for encrypting and de-encrypting a selective call signal to prevent unauthorized reading of the information encoded in the signal.

What is claimed is:

1. A paging terminal for secure radio frequency (RF) paging communications comprising:
   receiving means for receiving message information;
   encoding means for encoding the message information into data comprising a plurality of symbols;
   control means for determining whether the message information is numeric information or alphanumeric information;
   encryption means coupled to the encoding means and the control means for encrypting the data by adding a first predetermined number of additional symbols to the data to form an encrypted message if the control means determines that the message information is numeric information and for encrypting the data by adding a second predetermined number of additional symbols to the data to form the encrypted message if the control means determines that the message information is alphanumeric information; and
   transmission means for modulating the encrypted message to form a paging signal and for transmitting the paging signal.

2. The apparatus of claim 1 wherein said encryption means places the first or second predetermined number of additional symbols before the data to form the encrypted message.

3. The apparatus of claim 1 wherein said encryption means places the first or second predetermined number of additional symbols after the data to form the encrypted message.

4. The apparatus of claim 1 wherein said encryption means places a first portion of the first or second predetermined number of additional symbols before the data and a second portion of the first or second predetermined number of symbols after the data to form the encrypted message.

5. A paging receiver for receiving secure radio frequency (RF) paging communications comprising:
   receiver means for receiving and demodulating a paging signal to obtain paging information;
   first memory means coupled to said receiver means for storing said paging information;
   de-encryption means coupled to said first memory means for de-encrypting said paging information to derive de-encrypted information;
   decoding means coupled to said de-encryption means for decoding said de-encrypted information to derive a message;
   user input means for selectably generating a user input signal; and
   control means coupled to said first memory means and said user input means for causing said first memory means to provide said paging information stored therein to said de-encrypting means in response to said user input signal being equivalent to a predetermined de-encryption signal.

6. The paging receiver of claim 5 wherein said paging information is divisible into at least one data group, each of said at least one data group comprising a predetermined number of symbols, said receiver further comprising:
   second memory means for storing a first predetermined code assigned to said paging receiver; and
   processing means coupled to said second memory means for performing a first predefined function on said first predetermined code and a second predetermined code to obtain a de-encryption code, said de-encryption code having said predetermined number of symbols; and
   wherein said de-encryption means is coupled to said processing means for performing a second predefined function on said de-encryption code and each of said at least one data group to obtain said de-encrypted information comprising at least one symbol group, each of said at least one symbol group comprising said predetermined number of symbols.

7. The paging receiver of claim 6 wherein said second predetermined code is generated by said user input means.

8. The paging receiver of claim 6 wherein said second predetermined code is stored in said second memory means.

9. The paging receiver of claim 6 wherein said first and second predefined functions are an exclusive-OR function.

10. The paging receiver of claim 5 wherein said paging information comprises a plurality of symbols, and wherein said de-encryption means de-encrypts said information by removing a portion of said plurality of symbols, said portion comprising a predetermined number of symbols.

11. The paging receiver of claim 10 wherein said portion of said plurality of symbols are before a remaining portion of said plurality of symbols.

12. The paging receiver of claim 10 wherein said portion of said plurality of symbols are after a remaining portion of said plurality of symbols.

13. The paging receiver of claim 10 wherein said portion of said plurality of symbols are partially before and partially after a remaining portion of said plurality of symbols.

14. The paging receiver of claim 5 wherein said control means further erases said paging information from said first memory means in response to said user input signal equivalent to said predetermined de-encryption signal not being received by said control means within a predetermined time interval after said paging information is stored in said first memory means.

15. The paging receiver of claim 10 wherein said control means further comprises determining means for determining whether said paging information is numeric formatted or alphanumeric formatted, and wherein said de-encryption means de-encrypts said information by removing a portion of said plurality of symbols, said portion comprising a first predetermined number of symbols if said determining means determines that said paging information is numeric formatted and a second predetermined number of symbols if said determining means determines that said paging information is alphanumeric formatted.

16. The paging receiver of claim 15 wherein said portion of said plurality of symbols are before a remaining portion of said plurality of symbols.

17. The paging receiver of claim 15 wherein said portion of said plurality of symbols are after a remaining portion of said plurality of symbols.

18. The paging receiver of claim 15 wherein said portion of said plurality of symbols are partially before and partially after a remaining portion of said plurality of symbols.

* * * * *